United States Patent [19]

Bacon

[11] Patent Number: 4,776,062
[45] Date of Patent: Oct. 11, 1988

[54] SAUSAGE FILLING APPARATUS

[75] Inventor: Derek Bacon, Kedington, England

[73] Assignee: Haverhill Meat Products Limited, England

[21] Appl. No.: 947,872

[22] Filed: Dec. 30, 1986

[30] Foreign Application Priority Data

Jan. 2, 1986 [GB] United Kingdom ................ 8600024

[51] Int. Cl.⁴ .................................... A22C 11/02
[52] U.S. Cl. ................................................ 17/35
[58] Field of Search .................... 17/33, 34, 35, 41, 42, 17/49

[56] References Cited

U.S. PATENT DOCUMENTS

| | | | |
|---|---|---|---|
| 3,253,298 | 5/1966 | Stewart | 17/41 |
| 4,112,546 | 9/1978 | Muller | 17/49 |
| 4,549,330 | 10/1985 | Ziolko | 17/34 |

FOREIGN PATENT DOCUMENTS 0071024 7/1983 European Pat. Off. .

Primary Examiner—Willie G. Abercrombie
Attorney, Agent, or Firm—Bernard, Rothwell & Brown

[57] ABSTRACT

A sausage filling apparatus comprises a conventional sausage filling machine operable to extrude sausage meat into a compressed length of tubular sausage casing retained over a support pipe through which the meat is fed under pressure. The filled casing passes to a sausage linking machine where the casing is twisted into individually-linked sausages. The invention provides a moveable deflector plate which is moveable into the path of the tubular sausage casing between the nozzle and the linking machine. This causes the sausage casing to follow a tortuous path between these two points, dispelling air present in the casing and leading to more consistent weight and an improved appearance in the final product.

4 Claims, 2 Drawing Sheets

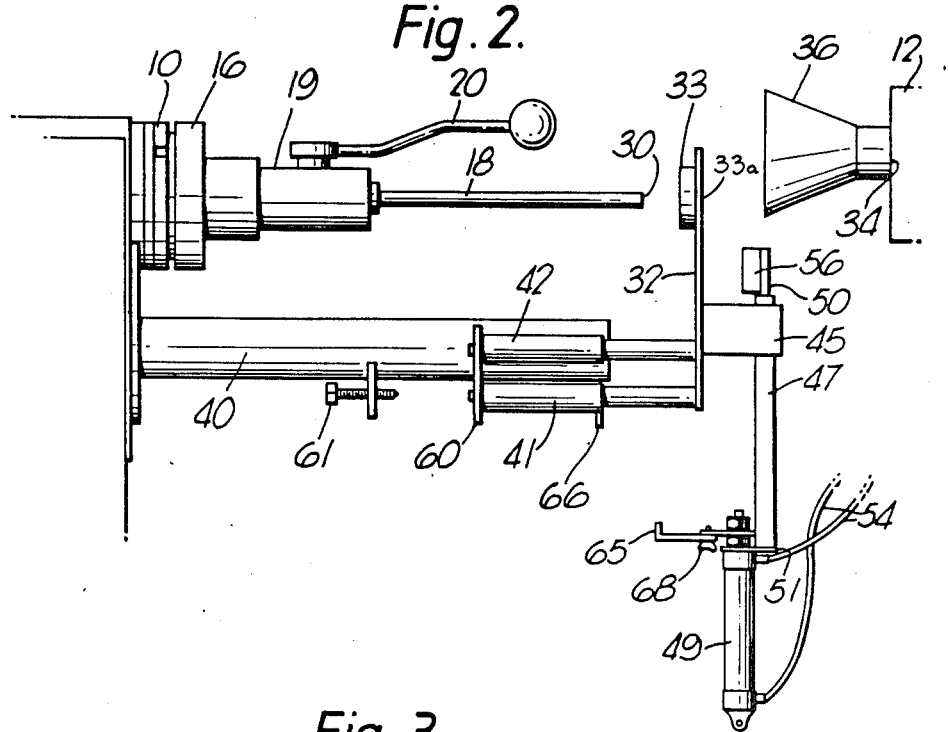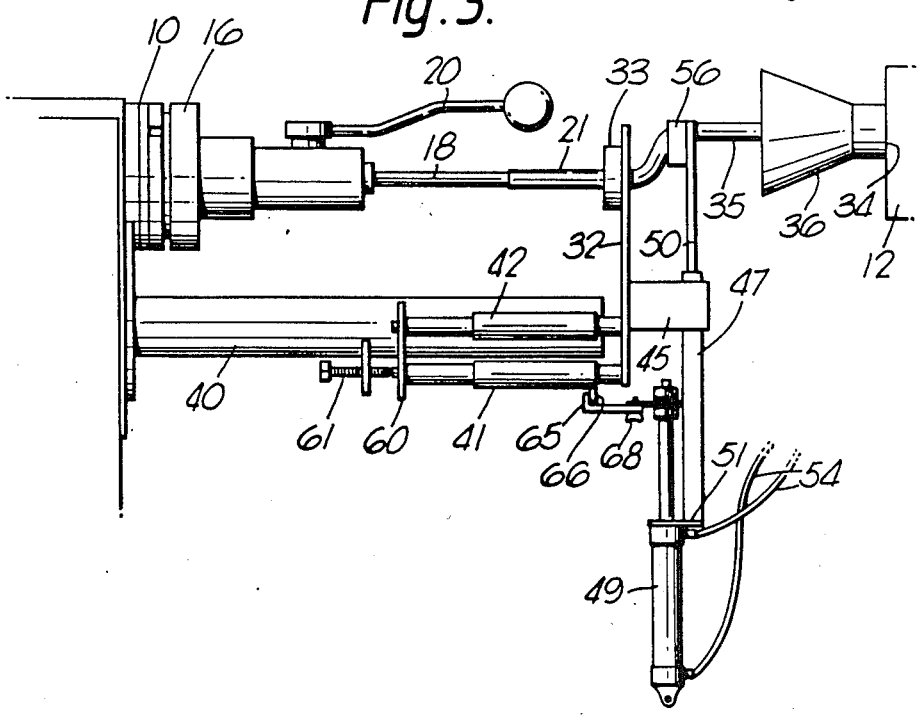

SAUSAGE FILLING APPARATUS

BACKGROUND OF THE INVENTION

This invention relates to sausage filling apparatus.

The production of sausages at high speed has been carried out for many years, but the increasing demands on food retailers have highlighted a number of drawbacks of existing sausage-making machinery.

One of these drawbacks concerns the appearance of the finished sausage. The high pressures used to force the sausage meat into the sausage casing tend to emulsify fats present in the sausage meat and leave these emulsified fats on the surface, hiding the lean meat content and giving the sausage an unattractive whitish appearance.

Another problem is the degree of accuracy required in production when sausages are sold in fixed-weight packs. If the packs are not to be unacceptably over- or under-weight, very consistent filling of the sausage casing is required during production. A frequent cause of under-weight sausages is the presence of air bubbles trapped in the sausage casing resulting from inconsistent filling.

It is an object of the present invention to provide a sausage filling apparatus which minimises or overcomes these disadvantages.

SUMMARY

The present invention provides a sausage filling apparatus comprising a nozzle and means for forcing sausage meat through the nozzle; support means for compressed tubular sausage casing disposed such that sausage meat forced through the nozzle passes into the casing; and a receiving device spaced from the nozzle for receiving the filled sausage casing, the apparatus being characterised in that deflector means are disposed between the nozzle and the receiving device operable to deflect the filled sausage casing as it leaves the nozzle.

High-speed sausage machines generally extrude the sausage meat into the casing along a straight path, which leads directly into a receiving device which is usually a sausage linking machine. Dispensing of the sausage casing is controlled by a resilient brake ring frictionally engaging the casing. It has been found that by deflecting the filled sausage casing as it passes out of the nozzle through the brake ring and causing it to follow a tortuous path to the receiving device, much of the air in the casing is dispelled. Furthermore, this also increases the back pressure on the filling pump and prevents the fatty emulsion from reaching the surface of the sausage casing, giving a much improved appearance to the finished sausage.

In a preferred embodiment of the invention, the axis of the receiving device is not aligned with the axis of the nozzle and the deflector means is movable into and out of the path of the filled sausage casing between the nozzle and the receiving device. This allows the sausage casing to be fed initially into the receiving device during a filling operation and then deflected from its straight path by moving the deflector means into contact with the casing.

In another embodiment of the invention, the receiving device is provided with a receiving funnel to facilitate feeding of the sausage casing into the receiving device at the commencement of the filling operation.

The invention also comprehends a method of filling a sausage casing in which sausage meat is forced through a nozzle into a length of sausage casing which is dispensed from the nozzle through resilient control means, characterised in that the filled casing is deflected away from a straight path as it leaves the nozzle.

BRIEF DESCRIPTION OF THE DRAWINGS

FIG. 2 is a side elevation of the apparatus shown in FIG. 1, in one position thereof; and FIG. 3 is also a side elevation of the apparatus shown in FIG. 1 in another position thereof.

DESCRIPTION OF THE PREFERRED EMBODIMENT

Figure 1:
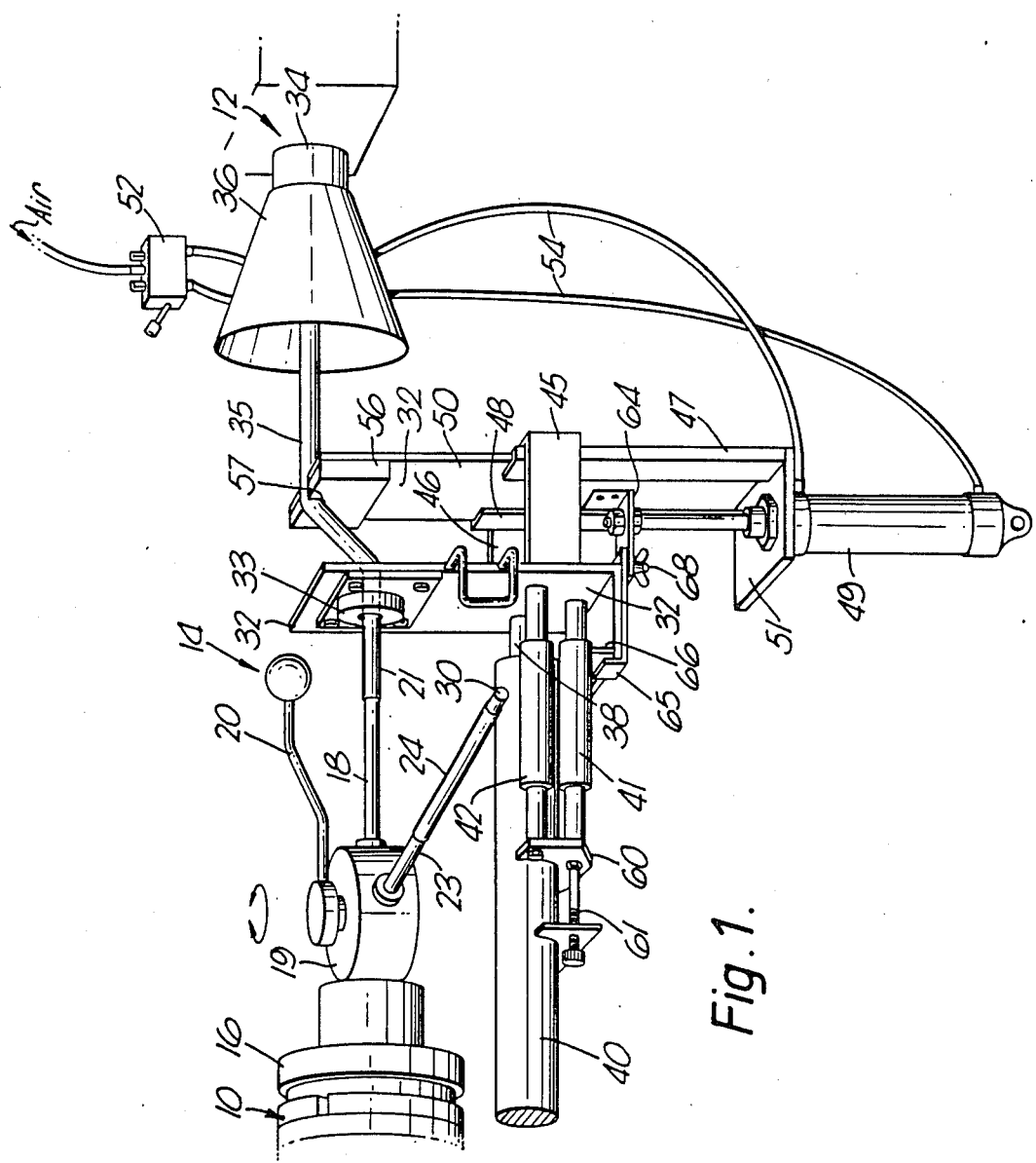
FIG. 1 shows a perspective view of a sausage filling apparatus.

Referring to the drawings, the sausage filling apparatus shown comprises three main components, namely a sausage filling machine 10, a sausage linking machine 12, and a control section 14. The filling machine 10 is of conventional construction and comprises a container for sausage meat fitted with a barrel 16 through which the sausage meat is extruded. It will be understood that the term "sausage meat" used herein is intended to cover the usual range of food products used as fillings for sausage, which as is well known do not consist solely of meat but include items such as meal, herbs, flavouring etc.

Operation of the filling machine is controlled conventionally by a foLt-switch (not shown), and during the filling operation sausage meat extruded through barrel 16 passes into distributor valve 19 where it is forced into either of the sausage casing support pipes 18 or 23 extending from the valve body, depending on the position of control handle 20. In FIG. 1, pipe 18 is shown in the operational position and pipe 23 in the stand-by position. Pipes 18 and 23 act as supports for lengths of compressed tubular sausage casing 21 which are disposed manually over the pipes. The casings may be for example three or four meters long or more and are generally made from collagen, although natural skins may be used instead in certain applications.

Two casing support pipes are provided so that one may be re-loaded by the machine operator with a fresh length of sausage casing material whilst the other is being filled. As will be described, anti-clockwise rotation of control handle 20 from the position shown in FIG. 1 will cause support pipe 23 to be moved into the operational filling position, whilst support pipe 18 is disconnected from the outlet from barrel 16 ready for a fresh "stand-by" sausage casing to be fitted. This movement may also activate automatically a switch to stop the filling machine 10 whilst the distributor valve 19 is being moved from one position to another, although in the embodiment shown control of the filling machine 10 is carried out only by operation of the foot switch.

Each casing support pipe 18 and 23 terminate in a nozzle 30, through which sausage meat is forced, the sausage casing being entrained by the meat as it passes out of the nozzle. Dispensing of the sausage casing material during filling is controlled by brake ring 33 which is mounted, co-axially with the operational support pipe, on support plate 32. Brake ring 33 is floatingly mounted to give a limited freedom of movement relative to plate 32 and comprises a resilient ring which during filling is disposed over the end of the support pipe frictionally to engage the sausage casing material. The purpose of the brake ring is to provide a consistent rate of sausage casing pull-off from the operational support pipe thereby giving the filled casing a consistent weight over its full length. During filling, sausage meat forced through the nozzle 30 and entrains the casing 35, and the continuous length of encased sausage 35 travels through an aperture 33a in support plate 32 and is collected by a guide funnel 36 which directs the filled casing into an entry aperture 34 of the sausage linking machine 12 which is operable to twist the continuous length of sausage at intervals to provide individually-linked sausages of the required size. The sausage linking machine 12 is of conventional construction and will not be described in detail here.

At its lower end, plate 32 is attached to spigot 38 which is slidably mounted in cylindrical guide 40. As will be seen from FIGS. 2 and 3, plate 32 and hence brake ring 33 can be made to move towards and away from the nozzle 30 of the operational support pipe 18 or 23 by means of a pair of air cylinders 41, 42 which are mounted on cylindrical guide 40 by bracket 60. An electrical solenoid may be used instead of air cylinders 41, 42 or alternatively, brake ring support plate 32 may be moved towards and away from the nozzle manually. Movement of the brake ring 33 away from support pipes 18, 23 enables the brake ring to be disengaged from the free end of the pipe to allow the interchanging of the support pipes when the stored length of sausage casing becomes exhausted.

The axial position of brake ring 33 relative to nozzle 30 during filling is critical to satisfactory dispensing of the casing, and this can be adjusted by means of an adjusting screw 61 which acts on the cylinders 41, 42.

Mounted on the other side of plate 32 also at the free end thereof is a pair of brackets 45, 46 which carry vertical guides 47, 48. A third pneumatic cylinder 49 is attached by bracket 51 to the lower end of these guides 47, 48. A sliding plate 50 is slidably mounted in guides 47, 48 and is movable between an extended position (shown in FIG. 3) and a retracted position (shown in FIG. 2) by means of pneumatic cylinder 49, which is connected to the lower end of the guide plate 50 by bracket 64. Also attached to bracket 64 is latch 65 which is engageable with stop 66 fixed to lower air cylinder 41. The position of latch 65 can be adjusted by nut 68. Operation of the cylinder 49, and hence movement of the plate 50, is controlled by means of a two-position pneumatic switch 52 connected to cylinder 49 by air lines 54.

Sliding plate 50 has attached to its upper end a guide plate 56 formed in its upper surface with a semi-circular recess 57 for accommodating filled sausage casing 35. There are no sharp edges on guide plate 56 or recess 57 and the guide plate is moulded from a smooth plastics material such as polycarbonate to provide the least possible resistant to movement of the sausage casing through the recess.

Operation of the sausage filling apparatus will now be described with particular reference to FIGS. 2 and 3.

Prior to commencing operations, the apparatus will be in the position shown in FIG. 2, with the support plate 32 and hence brake ring 33 spaced away from the nozzle end 30 of support pipe 18 and the sliding plate 50 in its retracted position.

To start the filling operation, one of the support pipes 18, 25 of distributor valve 19 with a compressed sausage casing loaded thereon, is rotated into the filling position by movement of handle 20. The foot switch is operated to commence the filling process and this automatically actuates air cylinders 41, 42 which retract support plate 32 to a point at which brake ring 33 engages the sausage casing 21. Extrusion of sausage meat through the nozzle 30 commences, entraining the sausage casing; the free end of the filled sausage casing issues rapidly towards the sausage linking machine 12, which it enters via aperture 34. Entry of the sausage into aperture 34 of the sausage linking machine 12 is facilitated by funnel guide 36. Once inside aperture 34, the filled casing is engaged by a linking mechanis adapted to twist the sausage casing into individually linked sausages.

As soon as the end of the sausage casing has entered aperture 34, the pneumatic switch 52 is operated to raise guide plate 50 into the path of the filled sausage casing 35, the semi-circular aperture 57 in the upper edge of guide plate 56 engaging the sausage casing and deflecting it from its straight path between nozzle 30 and aperture 34. This condition is shown in FIG. 3, and it will be seen from this figure that engagement of the guide plate 50 deflects the sausage immediately adjacent the nozzle and forces the sausage casing to take a tortuous path between the nozzle 30 and aperture 57. This deflection of the filled sausage casing, particularly the sharp change in direction adjacent the nozzle, creates a back-pressure adjacent nozzle 30 and brake ring 33, forcing air out of the sausage casing at this point and preventing the emulsified fat products in the sausage meat from reaching the surface of the casing. This produces a more consistently-filled casing with a superior appearance compared to a conventional sausage-making machine.

In the raised position of plate 50, latch 65 engages stop 66 and locks the assembly together, preventing the extrusion pressure from moving the brake ring 33 away from nozzle 30. The axial position of brake ring 33 during production can be adjusted by adjusting the position of latch 65 relative to bracket 64.

Latch 65 and stop 66 are only essential where movement of plate 32 is carried out manually. In the semi-automatic version illustrated, the plate can be locked in position by the pneumatic pressure in cylinders 41 and 42.

Once the compressed sausage casing 21 on support pipe 18 has been exhausted, the sausage filling machine 10 is stopped and switch 52 is operated to retract the guide plate 50 and to allow cylinder 42 to extend, clearing the brake ring 33 from nozzle 30 and enabling the handle 20 of rotary valve 19 to be operated so as to bring the standby support pipe 23 with its fresh casing 24 into position ready for the next filling operation.

In the embodiment shown, the filled sausage casing is deflected upwardly by a distance of 38 mm by the guide 56, which is spaced approximately 28 mm from the plate 32. These dimensions have been found to give the required degree of back-pressure without any untoward effects on the production rate.

What I claim is:

1. Sausage filling apparatus comprising a reservoir for sausage meat; a nozzle; filling means operable to force sausage meat from said reservoir through said nozzle under pressure; casing support means for supporting a length of compressed tubular sausage casing such that sausage meat forced through said nozzle passes into said casing and causes said casing to be dispensed from said casing support means; a receiving device spaced from said nozzle operable to receive the filled length of sausage casing; and a deflector element moveable between an inoperative position out of the path taken up the sausage casing between said nozzle and said receiving device, and an operative positon in said path; whereby said deflector element in its operative position is operable to deflect the casing from its direct path between said nozzle and said receiving device so as to cause the sausage casing to take a tortuous path therebetween, the longitudinal axis of said nozzle being spaced at a distance from the longitudinal axis of said receiving device, and said deflextor element being operable to deflect said sausage casing by the same distance at a point close to said nozzle.

2. Apparatus as claimed in claim 1, further comprising casing dispensing control means in the form of a resilient ring disposed over the end of the respective support pipe in its filling position operable to frictionally engage the casing material so as to provide uniform dispensing of sausage casing therefrom and thereby to promote uniform filling of the casing when said deflector element is in said operative positon.

3. Sausage filling apparatus comprising a reservoir for sausage meat; a nozzle; filling means operable to force sausage meat from said reservoir through said nozzle under pressure; casing support means for supporting a length of compressed tubular sausage casing such that sausage meat forced through said nozzle passes into said casing and causing said casing to be dispensed from said casing support means; a receiving device spaced from said nozzle operable to receive the filled length of sausage casing; and a deflector element mounted on a guide plate slidably mounted in a support for movement between an inoperative position out of the path taken by the sausage casing between said nozzle and said receiving device, and an operative position in said path; whereby said deflector element in its operative position is operable to deflect the casing from its direct path between said nozzle and said recieving device so as to cause the sausage casing to take a tortuous path therebetween; drive means operative to move the deflector element between its operative and inoperative positons; and control means for said drive means whereby movement of said deflector element can be controlled to cooperate with operation of said sausage filling means.

4. Apparatus as claimed in claim 3, further comprising casing dispensing control means in the form of a resilient ring disposed over the end of the respective support pipe in its filling position operable to frictionally engage the casing material so as to provide uniform dispensing of sausage casing therefrom and thereby to promote uniform filling of the casing when said deflector element is in said operative position.

* * * * *